(12) United States Patent
Koyama et al.

(10) Patent No.: US 6,246,454 B1
(45) Date of Patent: Jun. 12, 2001

(54) ACTIVE MATRIX LIQUID CRYSTAL DISPLAY AND METHOD OF FABRICATING SAME

(75) Inventors: Jun Koyama, Kanagawa; Yoshitaka Yamamoto, Nara, both of (JP)

(73) Assignees: Semiconductor Energy Laboratory Co., Ltd., Kanagawa-ken; Sharp Kabushiki Kaisha, Osaka, both of (JP)

( * ) Notice: Subject to any disclaimer, the term of this patent is extended or adjusted under 35 U.S.C. 154(b) by 0 days.

(21) Appl. No.: 08/770,785

(22) Filed: Dec. 20, 1996

(30) Foreign Application Priority Data

Dec. 19, 1995 (JP) ...................................................... 7-349229

(51) Int. Cl.[7] .......................... G02F 1/136; G02F 1/1339; G02F 1/1345
(52) U.S. Cl. ............................ 349/40; 349/151; 349/153; 349/187
(58) Field of Search ............................ 349/40, 149, 151, 349/153, 158, 159, 187, 190; 257/57, 72, 356, 363; 345/206

(56) References Cited

U.S. PATENT DOCUMENTS

| 4,394,067 | * | 7/1983 | Spruijt et al. | ......................... 349/153 |
| 5,148,301 | | 9/1992 | Sawatsubashi et al. | ............. 349/153 |
| 5,504,348 | * | 4/1996 | Yoshida et al. | ......................... 349/43 |
| 5,610,742 | | 3/1997 | Hinata et al. | ......................... 349/122 |

FOREIGN PATENT DOCUMENTS

| 47-99615 | 6/1982 | (JP) . |
| 57-99615 | 6/1982 | (JP) . |
| 59-166984 | 9/1984 | (JP) . |
| 4-355720 | 9/1992 | (JP) . |
| 6-123882 | 5/1994 | (JP) . |
| 6-186578 | 7/1994 | (JP) . |
| 6-258659 | 9/1994 | (JP) . |
| 6-258660 | 9/1994 | (JP) . |

* cited by examiner

Primary Examiner—James A. Dudek
Assistant Examiner—Tai V. Duong
(74) Attorney, Agent, or Firm—Fish & Richardson P.C.

(57) ABSTRACT

There is disclosed a small-sized, active matrix liquid crystal display having high reliability. The liquid crystal display comprises a TFT substrate, a counter substrate, and a layer of a liquid crystal material held between these two substrates. A plurality of pixel TFTs are arranged in rows and columns on the TFT substrate. Driver TFTs forming a driver circuit for driving the pixel TFTs are formed also on the TFT substrate. All of these TFTs are covered by the liquid crystal material directly or via a thin film to protect these TFTs. A short ring is cut after a rubbing operation and before bonding of the substrates. Therefore, during manufacturing, the TFTs are protected from static charges. Also, the cutting operation is facilitated.

37 Claims, 7 Drawing Sheets

DRIVER CIRCUIT TFT ← | → PIXEL TFT

ACTIVE MATRIX LIQUID CRYSTAL DISPLAY AND METHOD OF FABRICATING SAME

BACKGROUND OF THE INVENTION

1. Field of the Invention

The present invention relates to an active matrix liquid crystal display and, more particularly, to a miniaturized active matrix liquid crystal display having high reliability.

2. Description of the Related Art

An active matrix liquid crystal display uses a liquid crystal as a display medium. A pixel is disposed at each intersection in a matrix construction. Every pixel is equipped with a switching device. Information about the pixels is represented by turning on and off the switching devices. Three-terminal devices which are thin-film transistors having gate, source, and drain are most often used as the switching devices. The thin-film transistors are hereinafter often abbreviated as TFTs.

In the matrix construction, scanning lines (gate lines) extending parallel to a row are connected with the gate electrodes of the TFTs in this row. Signal lines (source lines) running parallel to a column are connected with the source (or drain) electrodes of the TFTs in this column. A circuit for driving the scanning lines and a circuit for driving the signal lines are also provided.

Figure 2:
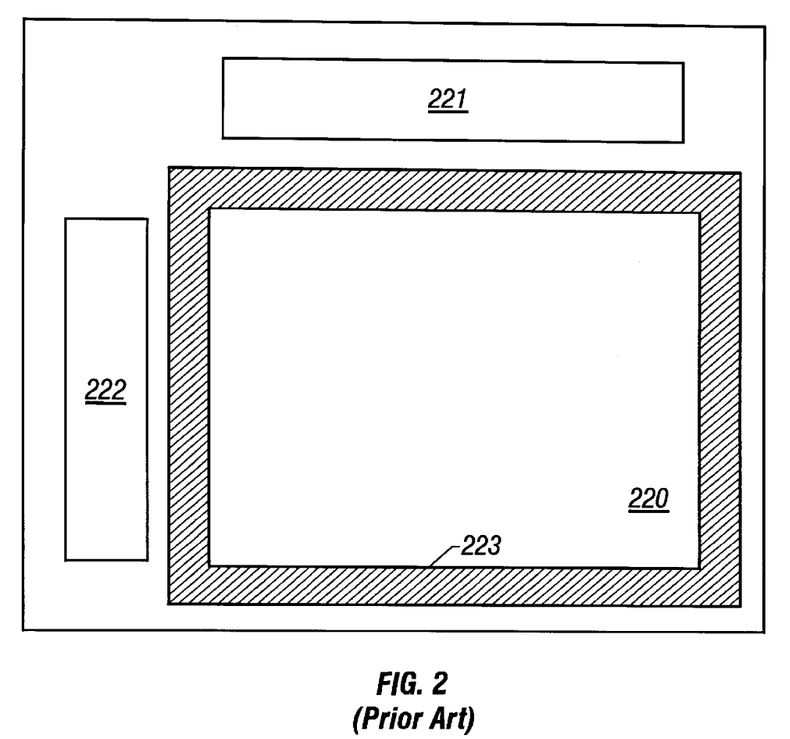
FIG. 2 is a schematic diagram of a conventional active matrix liquid crystal display.

FIG. 2 shows one conventional active matrix liquid crystal display. A signal line driver circuit 221 for driving signal lines is mounted above the pixel matrix 220 of this active matrix liquid crystal display. A scanning line driver circuit 222 for driving scanning lines is disposed to the left. Indicated by 223 is a sealant material region.

Figure 3:
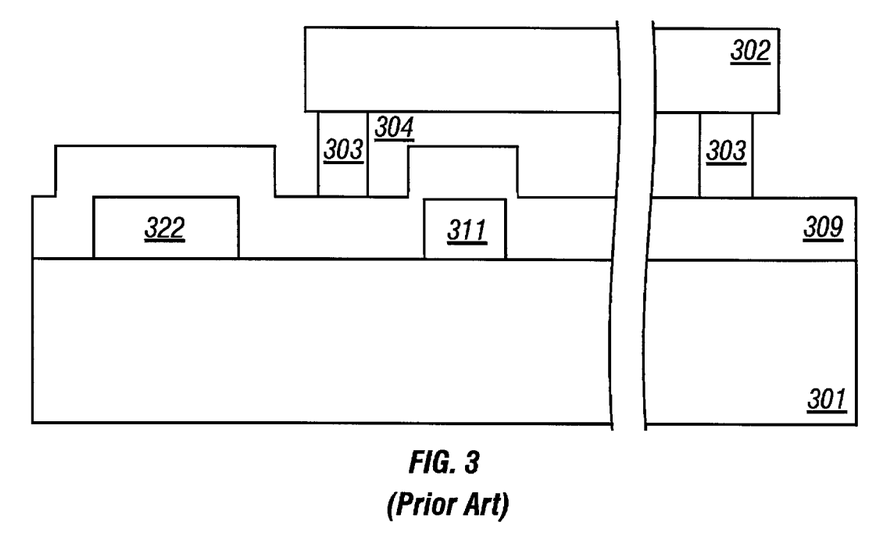
FIG. 3 is a cross-sectional view of the conventional active matrix liquid crystal display shown in FIG. 2.

FIG. 3 is a cross section of FIG. 2. Pixel TFTs 311 are covered by a liquid crystal material 304. A liquid crystal material 304 is held between a TFT substrate 301 and a counter substrate 302. On the other hand, the signal line driver circuit 221 and scanning line driver circuit 222 are protected only by a thin film 309 of oxide or nitride. Therefore, TFTs forming these driver circuits are placed in a harsher environment than the pixel TFTs 311 located inside the liquid crystal material.

In an attempt to solve the foregoing problems and to obtain long-term reliability, a display device structure having improved reliability has been devised. In this structure, both signal line driver circuit and scanning line driver circuit are placed within a liquid crystal material, as well as pixel TFTs.

Figure 4:
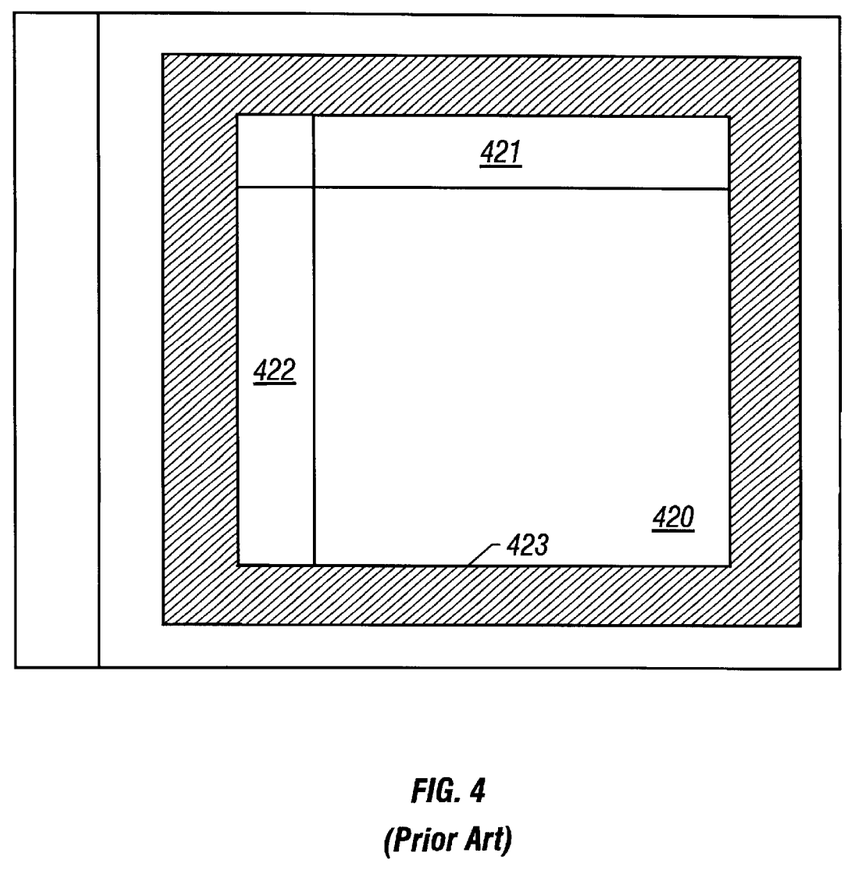
FIG. 4 is a diagram of another conventional active matrix liquid crystal display.

FIG. 4 shows a known device of this improved structure. In this known structure, a region of a sealant material or sealing material 423 is located outside both a signal line driver circuit 421 and a scanning line driver circuit 422. Therefore, the driver circuit TFTs are covered by the liquid crystal material, as well as the pixel TFTs. Furthermore, to miniaturize the liquid crystal display, three end surfaces (in FIG. 4, the top end surface, bottom end surface, and right end surface) of the counter substrate are made to conform to three end surfaces of the TFT substrate. Indicated by 420 is a pixel matrix.

These two conventional structures suffer from the following problems.

Figure 5:
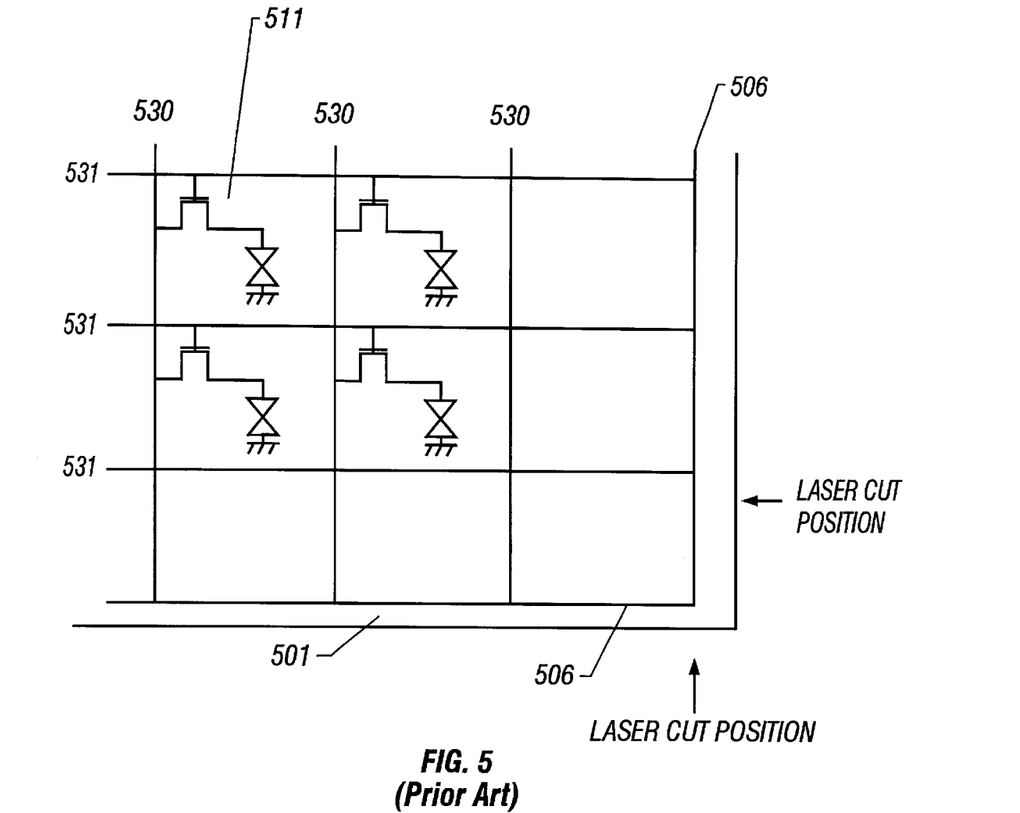
FIG. 5 is a diagram of a short ring used in a known active matrix liquid crystal display.

As shown in FIG. 5, in the conventional active matrix liquid crystal display, a short ring 506 is formed around the pixel matrix to protect the TFT devices from static charges. Since the signal lines 530 and scanning lines 531 connected with pixel TFTs 511 are all shorted, static charges produced during manufacturing steps, especially during rubbing steps, for the liquid crystal display are prevented from being applied across the terminals of each pixel TFT 511.

In the first-mentioned conventional structure shown in FIGS. 2 and 3, it is common practice to cut the short ring together with the glass substrate with a laser beam or the like in the final manufacturing step for the liquid crystal display.

Figure 6:
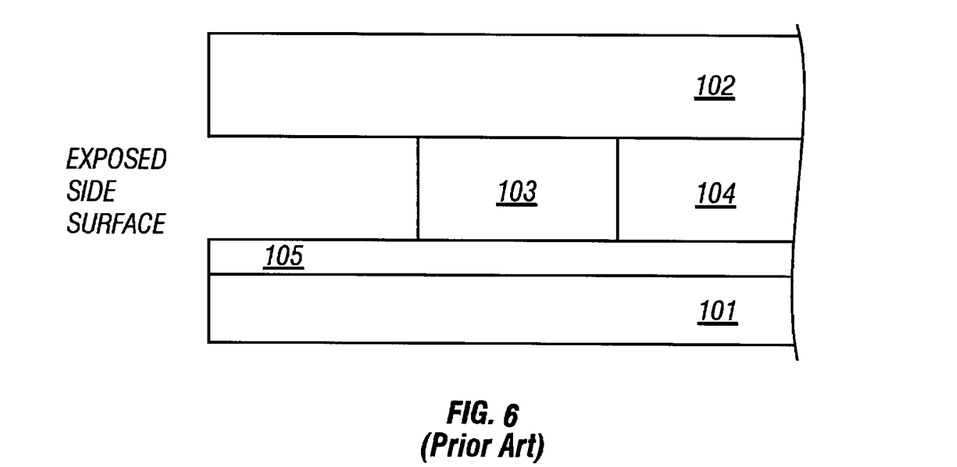
FIG. 6 is a cross-sectional view of the conventional active matrix liquid crystal display shown in FIG. 4.

However, in the second-mentioned conventional structure, in an attempt to minimize the size of the liquid crystal display, the counter substrate and the TFT substrate are preferably cut along common planes (in FIG. 4, the top end surface, bottom end surface, and right end surface of each substrate) from which no terminals are brought out. Accordingly, it is difficult to cut the short ring with a laser beam in the final step. In particular, the short ring is cut together with the substrate along a common plane. As shown in FIG. 6, after the cutting, the end surface of the TFT substrate 101 is exposed. If static charges are produced on the exposed end surfaces after the cutting, the internal pixel TFTs will be destroyed, thus making the display device defective.

SUMMARY OF THE INVENTION

A method of fabricating an active matrix liquid crystal display according to the present invention comprises the steps described hereinafter to solve the foregoing problem.

DETAILED DESCRIPTION OF THE PREFERRED EMBODIMENTS

Figure 1A:
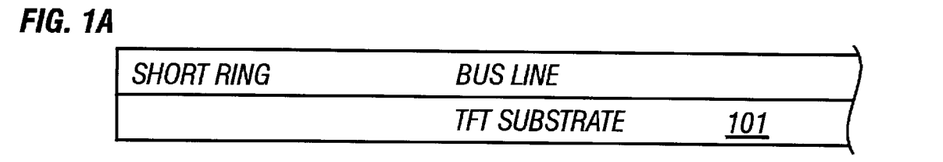
FIGS. 1(A)–1(E) are cross-sectional views, illustrating steps for assembling an active matrix liquid crystal display panel according to the present invention.
Figure 1B:
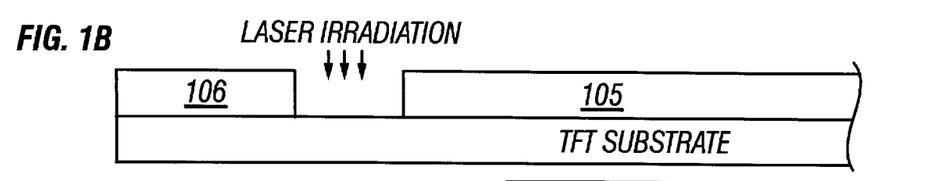
Figure 1C:
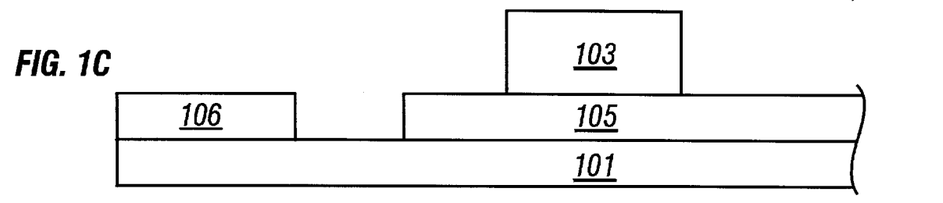
Figure 1D:
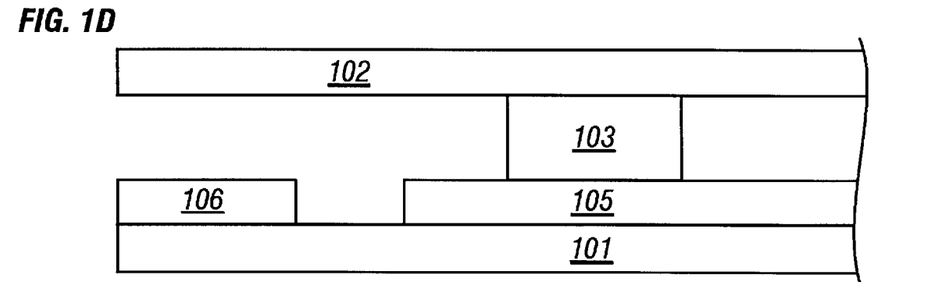
Figure 1E:
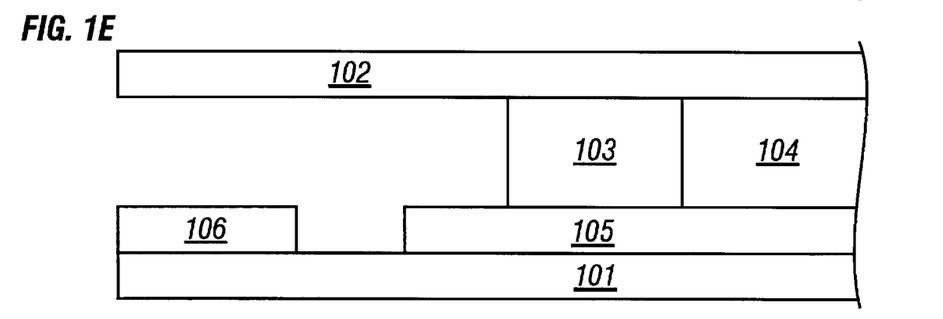

A specific example of configuration of active matrix liquid crystal display obtained by making use of the above-described structure is shown in FIG. 1(E), where a plurality of pixel TFTs are arranged in rows and columns on a TFT substrate 101. Driver TFTs forming a driver circuit for driving the pixel TFTs are also formed on the TFT substrate. A liquid crystal material 104 is sealed between a counter substrate 102 and the TFT substrate 101 by a sealant material 103. Since the driver TFTs are present inside the liquid crystal material along with the pixel TFTs, the driver TFTs can be protected. A bus line 105 connected with the pixel TFTs is severed from a short ring 106 to protect the pixel TFTs from static charges.

In the present invention, as shown in FIG. 1(B), the step for cutting the short ring 106 is carried out after a rubbing step in which static charges are induced. Therefore, during this step, the pixel TFTs can be protected from the static charges. Furthermore, the step for cutting the short ring 106 is performed prior to a step for bonding together the counter substrate 102 and the TFT substrate 101. Consequently, it is easy to cut the short ring 106.

A method of fabricating LCD (liquid crystal display) panels using active matrix circuits according to the invention will hereinafter be described in its illustrated embodiments 1 and 2.

Embodiment 1

Manufacturing steps for obtaining a monolithic active matrix circuit of the present embodiment are now described by referring to FIGS. 7(A)–7(D). These are low-temperature polysilicon processes. The left half of each figure illustrates steps for fabricating TFTs forming a driver circuit. The right half illustrates steps for fabricating TFTs forming an active matrix circuit.

Figure 7A:
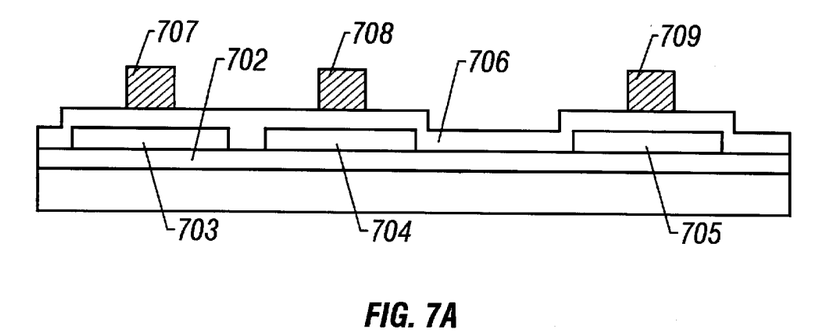
FIGS. 7(A)–7(D) and 8(A)–8(B) are cross-sectional views of a monolithic active matrix circuit according to a first embodiment of the invention, illustrating its process sequence.
Figure 7B:
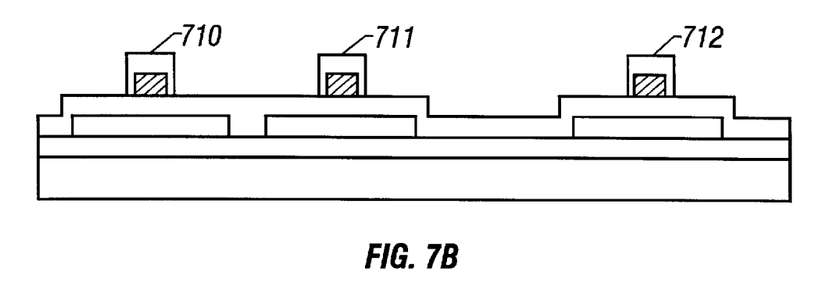
Figure 7C:
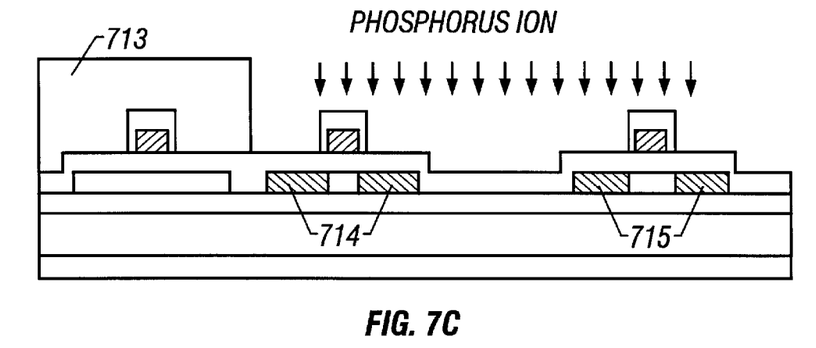

As shown in FIG. 7(A), a silicon oxide film is first formed as a buffer layer 702 on a glass substrate 701 to a thickness of 1000 to 3000 Å. This silicon oxide film may be formed in an oxygen ambient by sputtering or plasma CVD. Then, an amorphous silicon film is formed to a thickness of 300 to 1500 Å, preferably 500 to 1000 Å, by plasma CVD or LPCVD.

The amorphous silicon film is thermally annealed at a temperature higher than 500° C., preferably 500–600° C., to crystallize the film or to enhance its crystallinity. After this crystallization, the crystallinity may be further enhanced by carrying out photo-annealing making use of laser light or the like. Furthermore, during the crystallization making use of the thermal annealing, an element (or, a catalytic element) such as nickel for promoting crystallization of silicon may be added, as described in Japanese Unexamined Patent Publication Nos. 244103/1994 and 244104/1994.

Then, the crystallized silicon film is etched to form islands of an active layer 703 for P-channel TFTs forming a driver circuit, islands of an active layer 704 for N-channel TFTs forming the driver circuit, and islands of an active layer 705 for pixel TFTs forming a matrix circuit. Furthermore, a gate-insulating film 706 of silicon oxide is formed to a thickness of 500 to 2000 Å by sputtering in an oxygen ambient. The gate-insulating film 706 may be formed by plasma CVD. Where the silicon oxide film is formed by plasma CVD, it is desired to use monosilane ($SiH_4$) and oxygen ($O_2$) or nitrogen monoxide ($N_2O$) as a gaseous raw material.

Subsequently, an aluminum layer having a thickness of 2000 to 6000 Å is formed by sputtering over the whole surface of the laminate. The aluminum may contain silicon, scandium, palladium, or other material to prevent generation of hillocks in thermal processing steps conducted later. The aluminum film is etched to form gate electrodes 707, 708, and 709 (FIG. 7(A)).

Thereafter, the gate electrodes 707, 708, and 709 consisting of aluminum is anodized. As a result, surfaces of the gate electrodes 707, 708, 709 are changed into aluminum oxide, 710, 711, and 712. These aluminum oxide regions act as an insulator (FIG. 7(B)).

Then, a photoresist mask 713 covering the active layer 703 of the P-channel TFTs is formed. Phosphorus ions are introduced into the active layer 704 and 705, by ion doping while using phosphine as a dopant gas. The dose is $1\times10^{12}$ to $5\times10^{13}$ atoms/cm². As a result, heavily doped N-type regions, or source 714 and drain 715, are formed in the active layer, 704 and 705 (FIG. 7(C)).

Thereafter, a photoresist mask 716 for covering both active layer 704 for the N-channel TFTs and active layer 705 for the pixel TFTs is formed. Boron ions are introduced again into the active layer 703 by ion doping, using diborane ($B_2H_6$) as a dopant gas. The dose is $5\times10^{14}$ to $8\times10^{15}$ atoms/cm². As a result, heavily doped P-type regions 717 are formed in the active layer 703. Because of the doping steps described thus far, heavily doped N-type regions 714, 715 (source and drain) and heavily doped P-type regions 717 (source and drain) are formed (FIG. 7(D)).

Figure 7D:
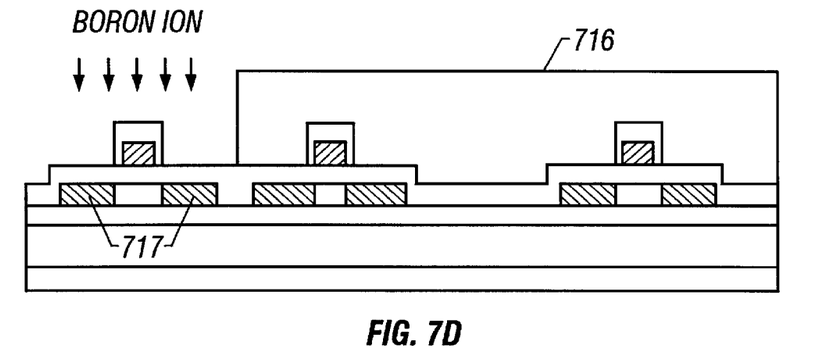

Then, the laminate is thermally annealed at 450–850° C. for 0.5 to 3 hours to activate the dopants and to repair the damage created by the doping. In this way, the dopants are activated. At the same time, the crystallinity of the silicon is recovered.

Figure 8A:
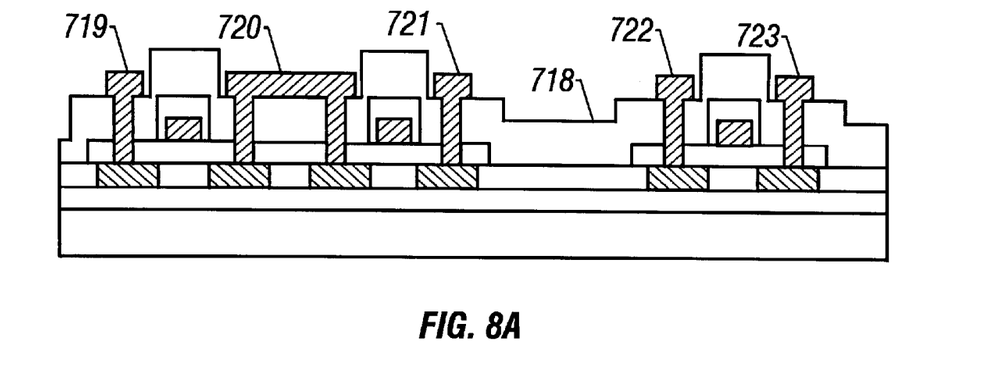

Thereafter, as shown in FIG. 8(A), a silicon oxide film having a thickness of 3000 to 6000 Å is formed as an interlayer dielectric 718 over the whole surface by plasma CVD. This interlayer dielectric 718 may be a monolayer of silicon nitride or a multilayer film of silicon oxide and silicon nitride. The interlayer dielectric 718 is etched by a wet etching process or a dry etching process to form contact holes in the source/drain regions.

Then, an aluminum film or a multilayer film of titanium and aluminum is formed to a thickness of 2000 to 6000 Å by sputtering techniques. This film is etched so as to create electrodes/interconnects, 719, 720, and 721, for a peripheral circuit and electrodes/interconnects, 722 and 723, for pixel TFTs (FIG. 8(A)).

Figure 8B:
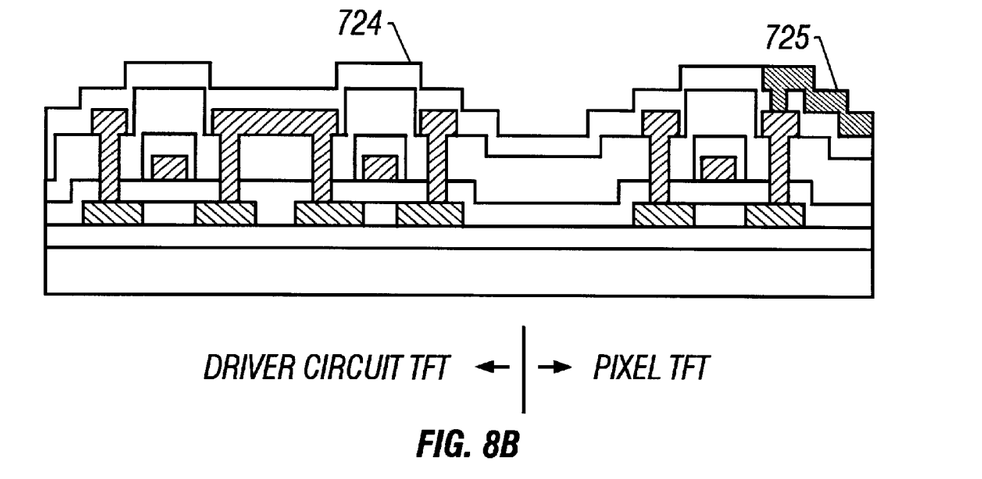

Subsequently, a silicon nitride film 724 is formed as a passivation film having a thickness of 1000 to 3000 Å by plasma CVD. This silicon nitride film is etched to create contact holes extending to the electrodes 723 of the pixel TFTs. An ITO (indium-tin oxide) film having a thickness of 500 to 1500 Å is formed by sputtering. Finally, the ITO film is etched to form pixel electrodes 725. In this manner, the peripheral driver circuit and active matrix circuit are formed integrally (FIG. 8(B)).

Steps for assembling the active matrix liquid crystal display are now described by referring to FIGS. 1(A)–1(E). The TFT substrate 101 and the counter substrate 102 are cleaned to clean up chemicals etc.

Then, an orientation film is made to adhere to each of the TFT substrate 101 and counter substrate 102. The orientation film is provided with grooves lying in a given direction. Liquid crystal molecules are oriented uniformly along the grooves. The orientation film material is created by preparing a solvent such as butyl Cellosolve or n-methyl-pyrrolidone and dissolving about 10% by weight of polyimide in the solvent. This is referred to as polyimide varnish and printed with a flexo-printing machine.

The orientation films adhering to the TFT substrate 101 and the counter substrate 102, respectively, are heated to cure them. This is known as baking. For this purpose, hot air having a maximum temperature of approximately 300° C. is blown against the orientation films to heat them. As a result, the polyimide varnish is sintered and cured.

Then, a rubbing step is carried out, as shown in FIG. 1(A). Each glass substrate having the orientation film adhering thereto is rubbed in a given direction with buff cloth consisting of fibers of rayon, nylon, or the like having fiber lengths of 2 to 3 mm to form minute grooves.

Then, as shown in FIG. 1(B), a short ring connected with the bus line 105 on the TFT substrate 101 is cut with a laser beam. In the present embodiment, a YAG laser is employed. The irradiation intensity is set to $1\times10^{17}/cm^2$ per pulse. This value is sufficient to cut the bus line 105.

Spherical spacers of a polymer-, glass-, or silica-based material are sprayed either at the TFT substrate 101 or at the counter substrate 102. The method of spraying the spacers can be a wet process in which spacers are mixed into a solvent such as pure water or alcohol and the solvent is sprayed onto the glass substrate. The method can also be a dry process in which spacers are sprayed without using solvent at all. An increase in the substrate area can be prevented by cutting the short ring at locations where the sealant material 103 are positioned.

Thereafter, as shown in FIG. 1(C), the sealant material 103 is applied to the outer frame of the pixel region of the TFT substrate, in order to bond together the TFT substrate 101 and the counter substrate 102 and to prevent the injected liquid crystal material 104 from flowing out. The used sealant material is prepared by dissolving epoxy resin and a phenolic curing agent in a solvent of ethyl Cellosolve. After the application of the sealant material, the two glass substrates are bonded together by a high-temperature pressing process at 160° C. so that the sealant material 103 is cured in about 3 hours.

Then, as shown in FIG. 1(D), the TFT substrate 101 and the counter substrate 102 are bonded together. The liquid crystal material 104 is injected through a liquid crystal injection port, followed by sealing of the port. After the completion of the sealing, the glass substrates, or the TFT substrate and counter substrate, are cut along the common planes lying in three directions (top side, bottom side, and right side of the display device shown in FIG. 2).

Subsequently, a nonconductive or weakly conductive resin is applied to the cut surfaces. For example, an epoxy resin is applied. As a result of the manufacturing steps described thus far, the liquid crystal display of the present embodiment is completed.

Embodiment 2

Figure 9:
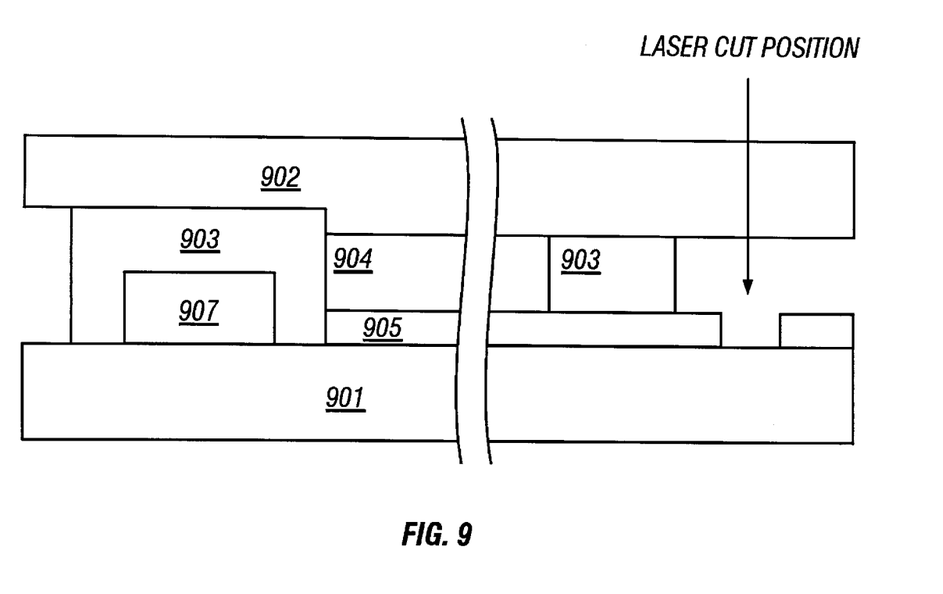
FIG. 9 is a cross-sectional view of an active matrix liquid crystal display according to a second embodiment of the invention.
Figure 10:
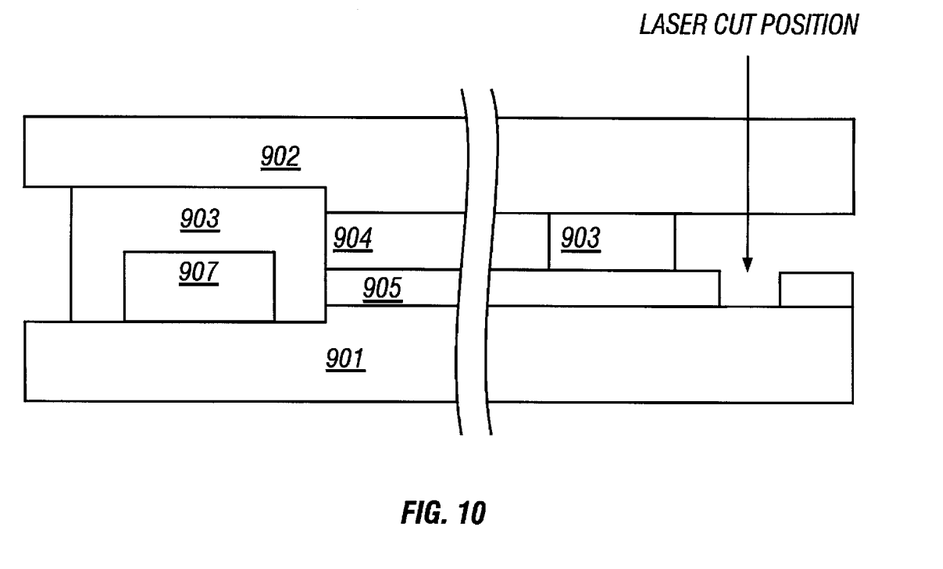
FIG. 10 is a cross-sectional view of a control circuit accommodation portion of an active matrix liquid crystal display according to the invention.

A second embodiment of the invention is shown in FIG. 9. In this embodiment, a control circuit 907 for controlling a driver circuit made up of TFTs is located under a sealant material 903 to reduce the packing area and to enhance the reliability. Normally, the control circuit 907 is made of a single-crystal silicon chip and thicker than a layer of a liquid crystal material 904. Therefore, it is impossible to place the control circuit in the sealant material 903 as it is. Accordingly, in the present embodiment, the counter substrate 902 is made thinner by an amount equal to the height of the protruding portion of the control circuit above the substrate gap, as shown in FIG. 9, to accommodate this problem.

Instead of reducing the thickness of the counter substrate, the thickness of the TFT substrate 901 may be reduced. Alternatively, thicknesses of both counter substrate 902 and TFT substrate 901 may be reduced.

The control circuit for controlling the aforementioned driver circuit is mounted on the TFT substrate by COG (chip-on-glass) technology. This COG technology is carried out either by a wire bonding operation in which the rear surface of the control circuit chip is bonded to the TFT substrate and electrically connected with the conductors on the TFT substrate by wire bonding, or by a face-down operation in which the chip is turned upside down and the pads on the chip are connected with the conductors on the TFT substrate by conductive paste or the like.

The TFT substrate and the counter substrate may be partially thinned by previously mechanically grinding away or chemically etching away portions of the counter substrate of interest.

In the present invention, the driver TFTs are hermetically sealed in a liquid crystal, as well as the pixel TFTs, as described above. Therefore, the temperature resistance and the contamination resistance of the driver TFTs can be improved.

Furthermore, the short ring is cut after the rubbing operation and before the substrate-bonding operation and so the reliability, especially the reliability against electrostatic damage, can be enhanced. Additionally, it is easy to cut the short ring.

Moreover, in the present invention, all necessary circuits including a control circuit for a driver circuit, can be placed between a pair of substrates by partially thinning at least one of TFT and counter substrates. Further, the active matrix liquid crystal display can be reduced in size by sealing these circuits in a liquid crystal material. Also, the reliability can be improved.

What is claimed is:

1. An active matrix liquid crystal display comprising:

a pixel thin film transistor provided over a TFT substrate;

driver thin film transistors formed over said TFT substrate and forming a driver circuit for driving said pixel thin film transistor;

a bus line provided over said TFT substrate and connected with said pixel thin film transistor, an end of said bus line being apart from an adjacent end surface of said TFT substrate thereto toward an inside of said TFT substrate;

a counter substrate located opposite to said TFT substrate; and a layer of a liquid crystal material with which said pixel thin film transistor and driver thin film transistors are in contact directly or via a thin film, said layer of the liquid crystal material being provided between said TFT substrate and said counter substrate; and a pattern comprising same material as said bus line and formed at said end surface of said TFT substrate over said TFT substrate in same layer as said bus line, wherein said end of said bus line is apart from said pattern toward an inside of said TFT substrate.

2. The display of claim 1, further comprising a control circuit for controlling said driver circuit made up of said driver thin film transistors, said control circuit being packed over said TFT substrate, and wherein said control circuit is sealed in a sealant material of said liquid crystal material placed over said TFT substrate.

3. The display of claim 1, further comprising a control circuit disposed at a control circuit accommodation portion of the TFT substrate, the control circuit accommodation portion being thinner than other portions of the TFT substrate.

4. The display of claim 1, further comprising a control circuit disposed at a control circuit accommodation portion of the counter substrate, the control circuit accommodation portion being thinner than other portions of the counter substrate.

5. The display of claim 2, wherein said control circuit is packed on said TFT substrate by COG (chip-on-glass) technology.

6. The display of claim 3, wherein said control circuit is packed on said TFT substrate by COG (chip-on-glass) technology.

7. The display of claim 4, wherein said control circuit is packed on said TFT substrate by COG (chip-on-glass) technology.

8. An active matrix liquid crystal display comprising:

a pixel thin film transistor provided over a TFT substrate and in an active matrix circuit;

driver thin film transistors formed over said TFT substrate and forming a driver circuit for driving said pixel thin film transistor;

a bus line provided over said TFT substrate and connected with said pixel thin film transistor, an end of said bus line being apart from an adjacent end surface of said TFT substrate thereto toward an inside of said TFT substrate;

a counter substrate located opposite to said TFT substrate;

a sealant material provided between said TFT substrate and said counter substrate;

a layer of a liquid crystal material with which said pixel thin film transistor and driver thin film transistors are in contact directly or via a thin film, said layer of the liquid crystal material being provided between said TFT substrate and said counter substrate, said liquid crystal material being sealed by said sealant material between said TFT substrate and said counter substrate; and a pattern comprising same material as said bus line and formed at said end surface of said TFT substrate over said TFT substrate in same layer as said bus line, wherein said end of said bus line is apart from said pattern toward an inside of said TFT substrate.

9. The display of claim 8, further comprising a control circuit for controlling said driver circuit made up of said driver thin film transistors, said control circuit being packed over said TFT substrate, and wherein said control circuit is sealed in said sealant material placed over said TFT substrate.

10. The display of claim 8, further comprising a control circuit disposed at a control circuit accommodation portion of the TFT substrate, the control circuit accommodation portion being thinner than other portions of the TFT substrate.

11. The display of claim 8, further comprising a control circuit disposed at a control circuit accommodation portion of the counter substrate, the control circuit accommodation portion being thinner than other portions of the counter substrate.

12. The display of claim 9, wherein said control circuit is packed on said TFT substrate by COG (chip-on-glass) technology.

13. The display of claim 10, wherein said control circuit is packed on said TFT substrate by COG (chip-on-glass) technology.

14. The display of claim 11, wherein said control circuit is packed on said TFT substrate by COG (chip-on-glass) technology.

15. A method of fabricating an active matrix liquid crystal display having a pixel thin film transistor over a TFT substrate, driver thin film transistors formed over said TFT substrate and forming a driver circuit for driving said pixel thin film transistor, a bus line provided over said TFT substrate and connected with said pixel thin film transistor, a counter substrate located opposite to said TFT substrate, and a layer of a liquid crystal material with which said pixel thin film transistor and driver thin film transistors are in contact directly or via a thin film, said layer of the liquid crystal material being provided between said TFT substrate and said counter substrate, said method comprising the steps of:

performing a rubbing operation;

then separating a short ring provided at an end surface of said TFT substrate from said bus line by cutting said bus line from said short ring while said end surface of said TFT substrate and said short ring are left uncut;

printing a sealant material over at least one of said TFT substrate and said counter substrate after the separating step; and then bonding together said TFT substrate and said counter substrate after the printing step while said TFT substrate has said end surface of said TFT substrate and the separated short ring.

16. The method of claim 15, further comprising the steps of:

packing a control circuit for controlling said driver circuit made up of said driver thin film transistors, over said TFT substrate; and sealing said control circuit for controlling said driver circuit made up of said driver thin film transistors in a sealant material that seals said liquid crystal material, said sealant material being positioned over said TFT substrate.

17. The method of claim 15, further comprising the step of thinning a control circuit accommodation portion of said TFT substrate to install a control circuit for controlling said driver circuit made up of said driver thin film transistors in said control circuit accommodation portion of said TFT substrate.

18. The method of claim 15, further comprising the step of thinning a portion of said counter substrate located opposite to a control circuit accommodation portion of said TFT substrate, in order to install a control circuit for controlling said driver circuit in said control circuit accommodation portion of said TFT substrate.

19. The method of claim 16, wherein said control circuit is packed on said TFT substrate by COG (chip-on-glass) technology.

20. The method of claim 17, wherein said control circuit is packed on said TFT substrate by COG (chip-on-glass) technology.

21. The method of claim 18, wherein said control circuit is packed on said TFT substrate by COG (chip-on-glass) technology.

22. A method of fabricating an active matrix liquid crystal display having a pixel thin film transistor over a TFT substrate, driver thin film transistors formed over said TFT substrate and forming a driver circuit for driving said pixel thin film transistor, a bus line connected with said pixel thin film transistor and provided over said TFT substrate, a short ring provided at an end surface of said TFT substrate, a counter substrate located opposite to said TFT substrate, and a layer of a liquid crystal material with which said pixel thin film transistor and driver thin film transistors are in contact directly or via a thin film, said layer of the liquid crystal material being provided between said TFT substrate and said counter substrate, said method comprising the steps of:

performing a rubbing operation on an orientation film provided over at least said TFT substrate while said short ring and said bus line are connected with each other by a continuous form from said short ring to said bus line;

separating said short ring from said bus line connected with said pixel thin film transistor by laser cutting said bus line from said short ring after said rubbing operation while said end surface of said TFT substrate and said short ring are left uncut;

printing a sealant material over at least one of said TFT substrate and said counter substrate after the separating step; and then bonding together said TFT substrate and said counter substrate while said TFT substrate has said end surface of said TFT substrate and the separated short ring.

23. The method of claim 22, further comprising the steps of:

packing a control circuit for controlling said driver circuit made up of said driver thin film transistors, over said TFT substrate; and sealing said control circuit for controlling said driver circuit made up of said driver thin film transistors in a sealant material that seals said liquid crystal material, said sealant material being positioned over said TFT substrate.

24. The method of claim 22, further comprising the step of thinning a control circuit accommodation portion of said TFT substrate in order to install a control circuit for controlling said driver circuit made up of said driver TFTs in said control circuit accommodation portion.

25. The method of claim 22, further comprising the step of thinning a portion of said counter substrate located opposite to a control circuit accommodation portion of said TFT substrate, in order to install a control circuit for controlling said driver circuit in said control circuit accommodation portion.

26. The method of claim 23, wherein said control circuit is packed on said TFT substrate by COG (chip-on-glass) technology.

27. The method of claim 24, wherein said control circuit is packed on said TFT substrate by COG (chip-on-glass) technology.

28. The method of claim 25, wherein said control circuit is packed on said TFT substrate by COG (chip-on-glass) technology.

29. A method of fabricating an active matrix liquid crystal display having a pixel thin film transistor over a TFT substrate, driver thin film transistors formed over said TFT substrate and forming a driver circuit for driving said pixel thin film transistor, a bus line connected with said pixel thin film transistor and provided over said TFT substrate, a short ring provided at an end surface of said TFT substrate, a control circuit provided over said TFT substrate for controlling said driver circuit, a counter substrate located opposite to said TFT substrate, and a layer of a liquid crystal material with which said pixel thin film transistor and driver thin film transistors are in contact directly or via a thin film, said layer of the liquid crystal material being provided between said TFT substrate and said counter substrate, said method comprising the steps of:

performing a rubbing operation on an orientation film provided over at least said TFT substrate while said short ring and said bus line are connected with each other by a continuous form from said short ring to said bus line;

separating said short ring from said bus line connected with said pixel thin film transistor by cutting said bus line from said short ring at a side of said TFT substrate distant from said control circuit after said rubbing operation while said end surface of said TFT substrate and said short ring are left uncut;

printing a sealant material over at least one of said TFT substrate and said counter substrate after the separating step; and then bonding together said TFT substrate and said counter substrate while said TFT substrate has said end surface of said TFT substrate and the separated short ring.

30. The method of claim 29, wherein said cutting is laser cutting.

31. The display of claim 1, further comprising other bus lines and other pixel thin film transistors provided over said TFT substrate wherein said other bus lines are connected with said other pixel thin film transistors, respectively, and said bus line and said other bus lines are connected with each other by said short ring.

32. The display of claim 8, further comprising other bus lines and other pixel thin film transistors provided over said TFT substrate wherein said other bus lines are connected with said other pixel thin film transistors, respectively, and said bus line and said other bus lines are connected with each other by said short ring.

33. The method of claim 15, wherein said active matrix liquid crystal display further comprises other bus lines and other pixel thin film transistors provided over said TFT substrate wherein said other bus lines are connected with said other pixel thin film transistors, respectively, and said bus line and said other bus lines are connected with each other by said short ring.

34. The display of claim 1 wherein said pattern has a shape of at least a part of a short ring.

35. The display of claim 8 wherein said pattern has a shape of at least a part of a short ring.

36. The display of claim 1 further comprising a control circuit provided over said TFT substrate on a side of said TFT substrate distant from saved pattern.

37. The display of claim 8 further comprising a control circuit provided over said TFT substrate on a side of said TFT substrate distant from said pattern.

* * * * *

UNITED STATES PATENT AND TRADEMARK OFFICE
CERTIFICATE OF CORRECTION

PATENT NO. : 6,246,454 B1
DATED : June 12, 2001
INVENTOR(S) : Jun Koyama and Yoshitaka Yamamoto It is certified that error appears in the above-identified patent and that said Letters Patent is hereby corrected as shown below:

<u>Title page,</u>
Item [22], change "Filed: Dec. 20, 1996" to read -- Filed: Dec. 19, 1996 --.

Signed and Sealed this

Eleventh Day of December, 2001

Attest:

NICHOLAS P. GODICI
*Attesting Officer*     *Acting Director of the United States Patent and Trademark Office*